United States Patent
Fatehi et al.

(10) Patent No.: US 6,512,612 B1
(45) Date of Patent: Jan. 28, 2003

(54) INTELLIGENT OPTICAL ROUTER

(75) Inventors: Mohammad Taghi Fatehi, Middletown Township, NJ (US); Kazem Anaraky Sohraby, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/344,101

(22) Filed: Jun. 25, 1999

(51) Int. Cl.[7] .................................................. H04J 4/00
(52) U.S. Cl. ........................ 359/123; 359/123; 359/127; 359/128; 370/401
(58) Field of Search .............................. 359/123, 127, 359/128; 370/401

(56) References Cited

U.S. PATENT DOCUMENTS 5,343,314 A * 8/1994 Nakamura et al. .......... 359/123
5,790,548 A * 8/1998 Sistanizadeh et al. ....... 370/401
6,111,673 A * 8/2000 Chang et al. ............... 359/123
6,374,307 B1 * 4/2002 Ristau et al. ............... 359/128

* cited by examiner

*Primary Examiner*—Jason Chan
*Assistant Examiner*—Dzung Tran
(74) *Attorney, Agent, or Firm*—John A. Caccuro

(57) ABSTRACT

An optical router includes a capacity utilization unit which determines a packet capacity utilization level of each of a plurality of wavelengths being received at the optical router and a packet combiner unit which combines packets from the two or more wavelengths onto only one of those wavelengths for transmission from the optical router when the combined determined packet utilization level on the two or more wavelengths is less than a predetermined packet utilization level. According to one feature, the router also determines the destination of the packets on each of the wavelengths and only combines the packets of two or more wavelengths if their packets have the same next-hop router or the same termination router destination.

22 Claims, 16 Drawing Sheets

| START FLAG | ORIG ADD | DEST ADD | CONTROL (CRC/FEC) | OTHER | DATA | END FLAG |
|---|---|---|---|---|---|---|

DATA PACKET

INTELLIGENT OPTICAL ROUTER

TECHNICAL FIELD OF THE INVENTION

This invention relates to optical communication systems and, more particularly, to apparatus and operating method for an intelligent optical router for combining the packets from one or more underutilized wavelengths onto another underutilized wavelength.

BACKGROUND OF THE INVENTION

In electronic routers for internet applications, routers buffer incoming and/or outgoing traffic. In certain situations, routers may measure required capacity for transmission over the links in order to improve the overall network performance. In electronic routers increasing the link capacity, corresponds either to an increase in the number of time slots (in the case of TDM) or frequencies (in the case of FDM) in order to accommodate the traffic demand. Demand is measured by examining the number of entities (such as packets) at the incoming or outgoing links of the router.

In optical routers used in optical neworks, there is a preference for not having to use optical buffering at the router. This is because today there are no practically feasible all-optical buffers that can be easily implemented with existing optical technology. Consequently, if buffers are used at an optical router, that buffer must use electronic circuits requiring a signal conversion from optics to electronics and back again.

Because of the ever increasing transmission capacity demand made on optical networks, there is a continuing need to improve the capacity utilization efficiency of optical routers and fibers used in the optical network.

SUMMARY OF THE INVENTION

In accordance with the method and apparatus of our invention, an optical router comprises (1) a capacity utilization apparatus which determines the packet capacity utilization level of each of a plurality of wavelengths received at the optical router and (2) a packet combiner apparatus which combines packets from the two or more wavelengths onto only one wavelength for transmission from the optical router when the combined determined packet utilization level of the two or more wavelengths is less than a predetermined packet utilization level.

According to one feature, the router also determines the destination of the packets on each of the wavelengths and only combines the packets of two or more wavelengths if their packets have the same next-hop router or the same termination router destination. Moreover, the plurality of wavelengths received at the optical router may be received over the same or different optical links.

BRIEF DESCRIPTION OF THE DRAWINGS

FIG. 8 shows the format of a typical data packet; and

In the following description, each item or block of each figure has a reference designation associated therewith, the first number of which generally refers to the figure in which that item is first described (e.g., 101 is first described in FIG. 1).

DETAILED DESCRIPTION

In an Optical Internet, Two Levels of Multiplexing Occur (1) Time division and/or statistical multiplexing where signals from different sources connected to a multiplexer are combined at the output of the multiplexer. Sometimes, depending on the (electrical) buffer size at source and/or input to the multiplexer, output capacity of the multiplexer is adjusted in order to accommodate the varying capacity demand. Bandwidth allocation through wavelength assignments using electrical signal measurements is the subject of our pending patent application M. T. Fatehi and K. Sohraby, Ser. No. 09/173,793, filed on Oct. 16, 1998 and entitled "Dynamically Assignable Optical Signal Access Apparatus."

(2) Optical wavelength division multiplexing where capacity of the output link to the multiplexer is varied at each router by allocating an appropriate number of wavelengths in order to respond to the traffic demand. This may require signal conversion from optics to electronics and back to optics. The present invention uses optical statistical multiplexing and hence the term "intelligent optical router." The disclosed intelligent optical router contrasts with our above-identified pending application in that there is no need for coordinating wavelength allocation at the access devices (usually these devices are electronic).

Figure 1:
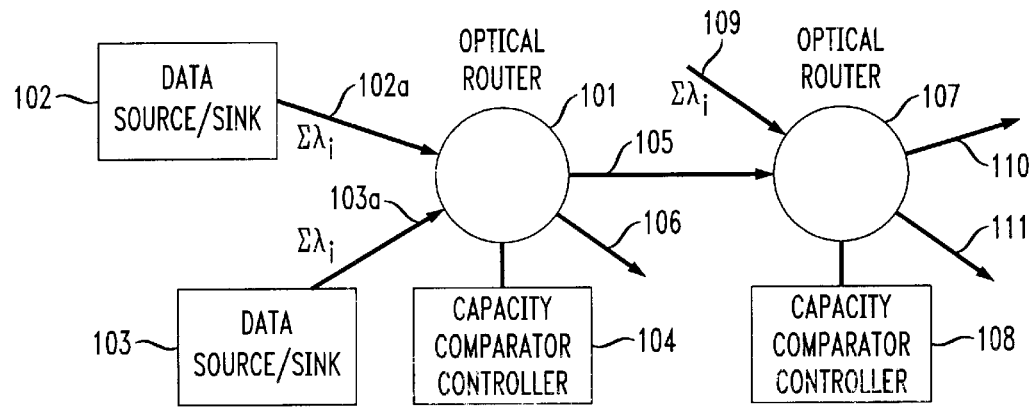
FIG. 1 shows an illustrative block diagram of an optical network in which the present invention may be utilized.

Shown in FIG. 1 is an Optical Network (ON) in which the intelligent optical router of the present invention may be utilized. The ON includes an optical router 101 to concentrate/distribute traffic, received over facilities 102a, from a data source/sink 102 and/or 103. Illustratively, the user data source/sink 102 may be an end-user location or another router location. Using well known optical link (OL) transport techniques, data traffic is carried from the data source/sink 102 to router 101 over OL 102a using one or more wavelengths. It is assumed that all packets of a particular wavelength on each OL are destined for the same terminating router.

Figure 2:
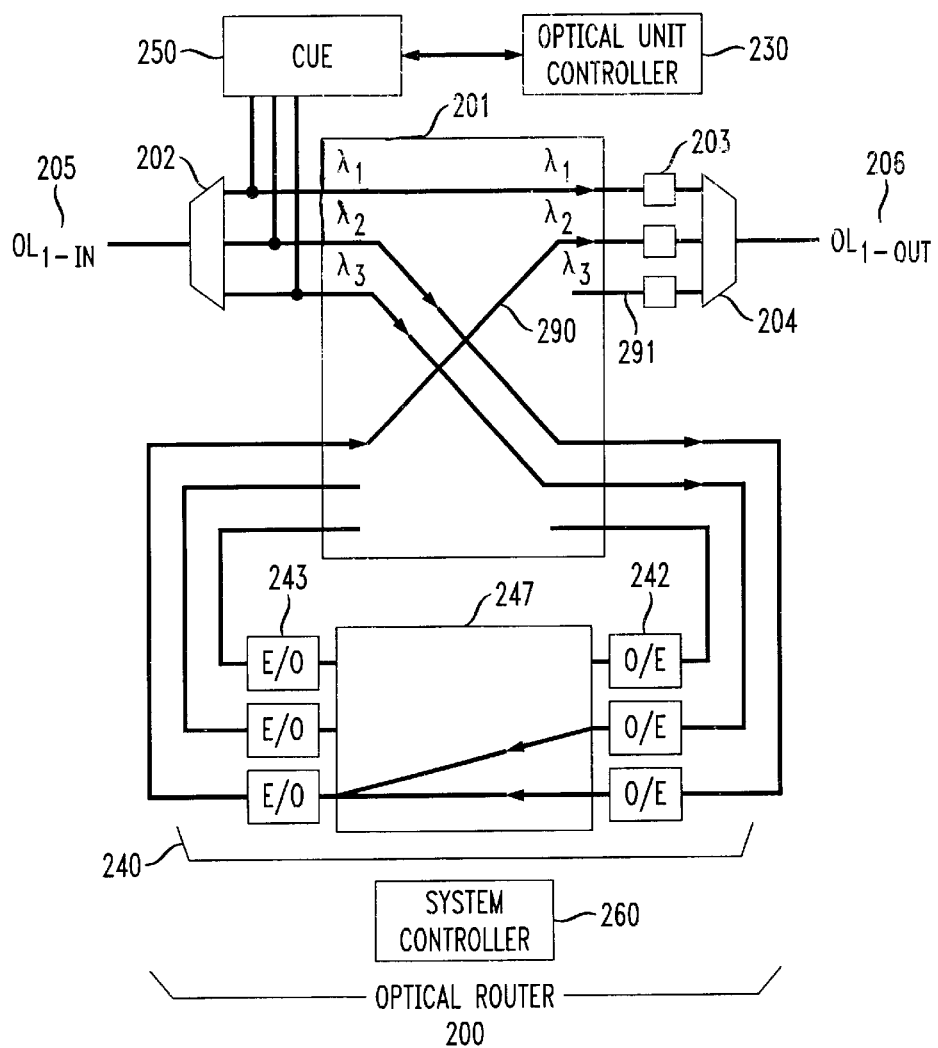
FIG. 2 shows a simplified diagram of the optical router useful in explaining the operation of the present invention.
Figure 3A:
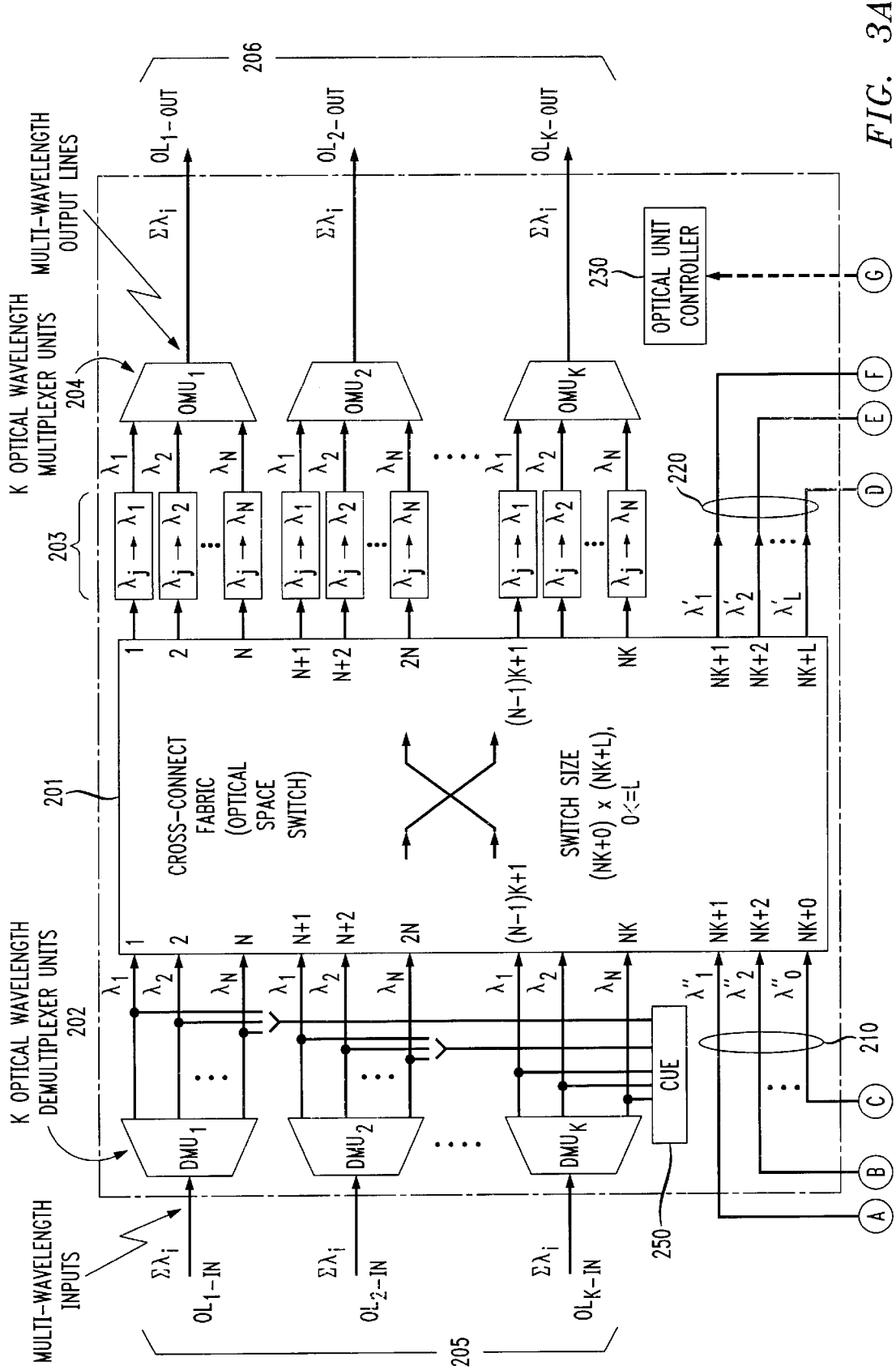
FIG. 3 shows a first illustrative block diagram of a wavelength interchanging optical router in accordance with the present invention.
Figure 3B:
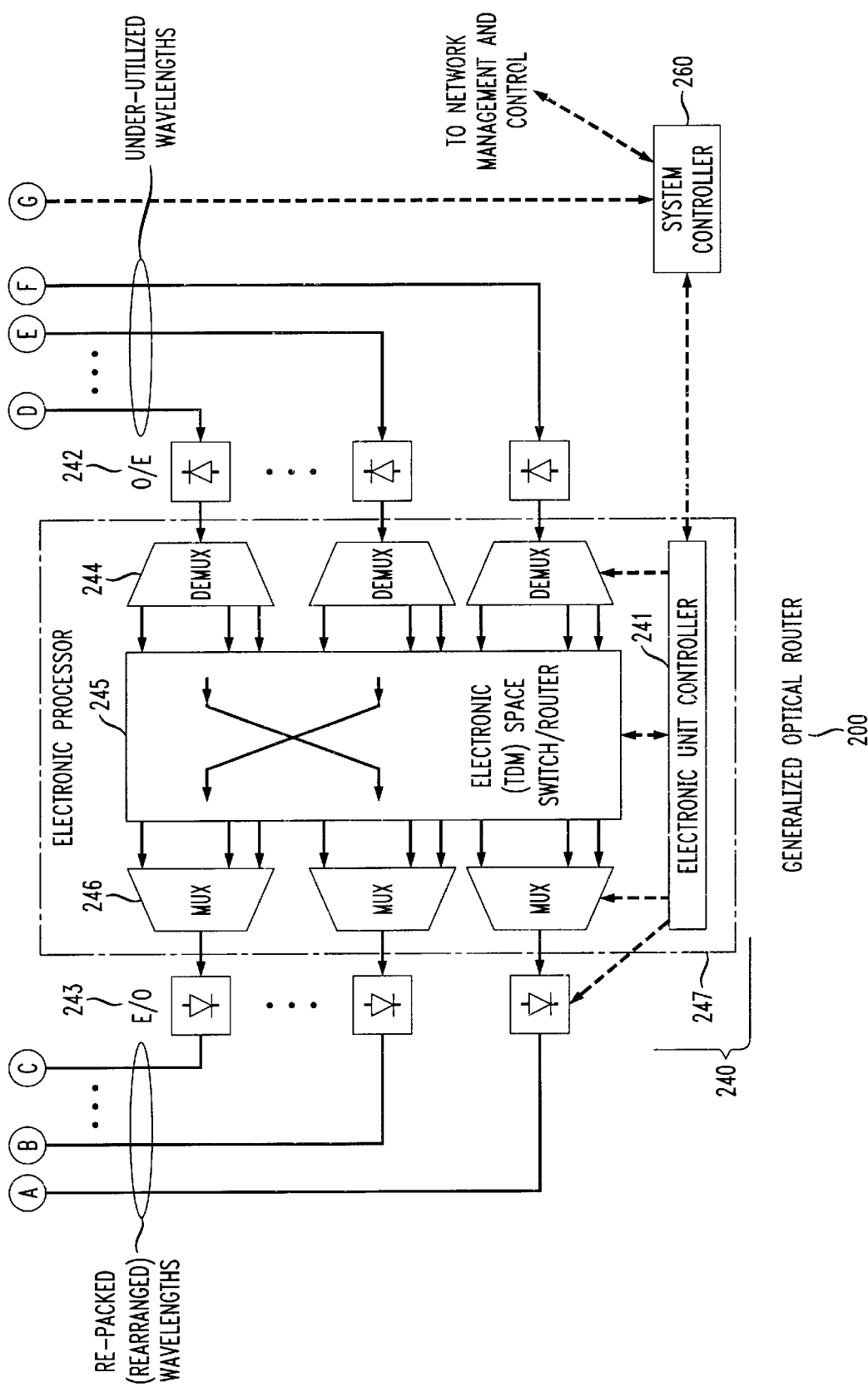
Figure 4A:
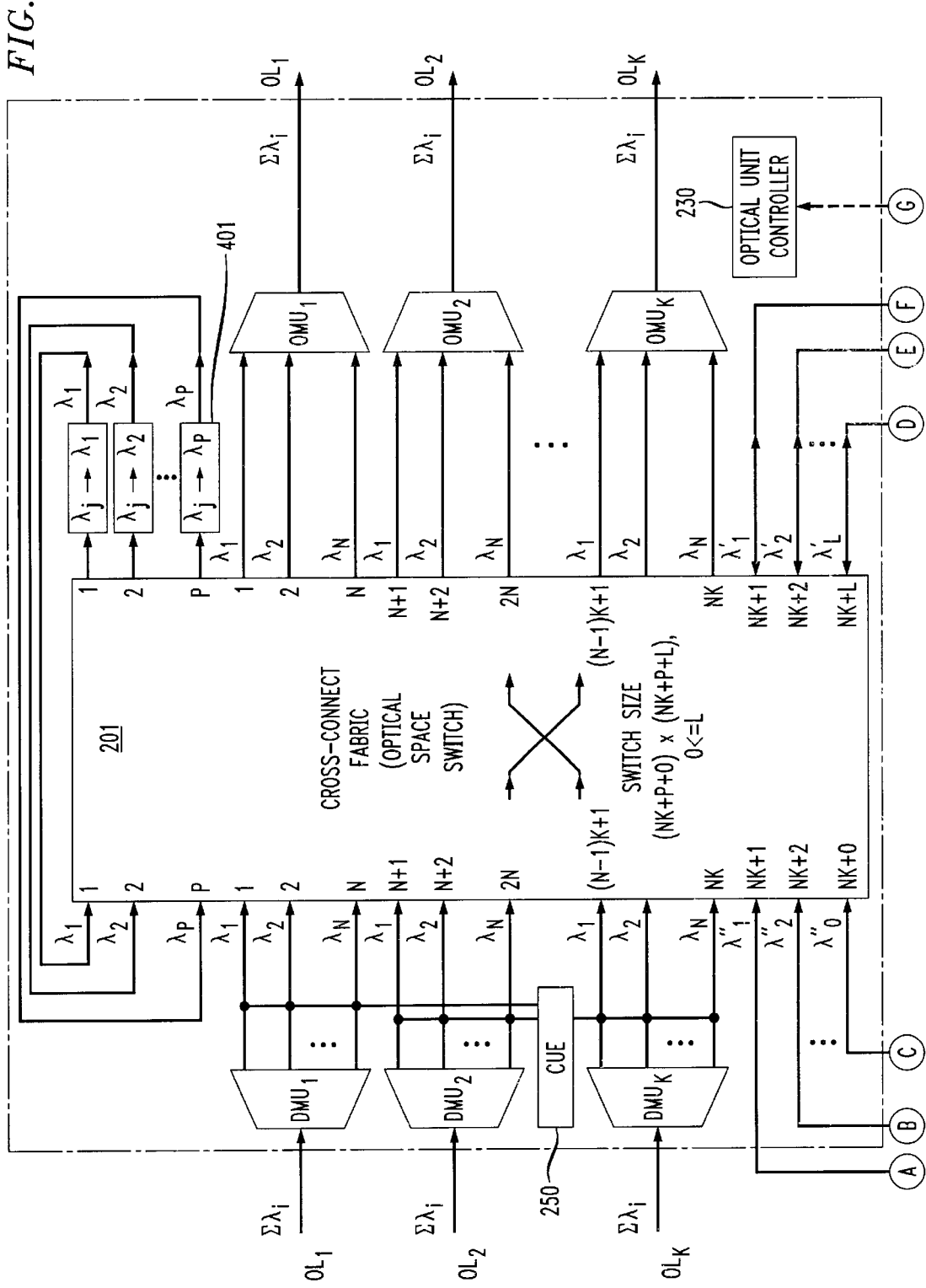
FIG. 4 shows a second illustrative block diagram of a wavelength interchanging optical router.
Figure 4B:
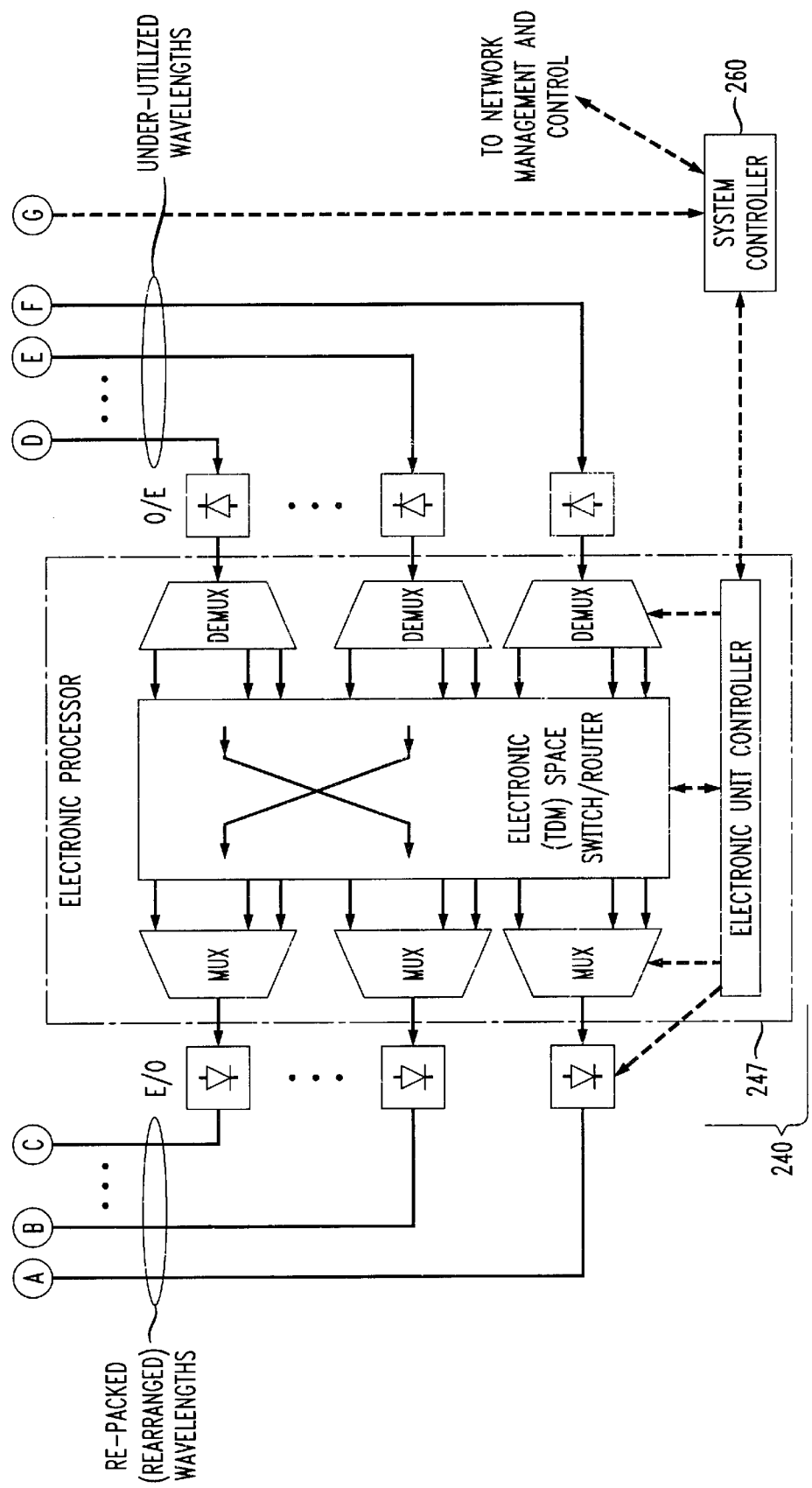

In accordance with the present invention, a capacity comparator controller 104 includes a capacity utilization estimator circuit (FIGS. 5 or 6) and a packet combiner circuit (e.g., 240 of FIG. 2). The capacity utilization estimator circuit determines the packet utilization of each of the plurality of wavelengths over each optical link (OL), 102a and 103a. The capacity comparator controller 104 uses an algorithm (FIGS. 9a–9c) to determine when the packets of two or more wavelengths received over an OL, e.g., 102a, can be combined using only one of the wavelengths. The packet combiner circuit of capacity comparator controller 104 then combines the packets from the two or more wavelengths onto a single wavelength. The capacity comparator controller 104 performs the same function for each of the OLs 102a, 103a which terminate at router 101. In accordance with another aspect of the invention, capacity comparator controller 104 also determines the destination of the packets on each of the wavelengths and only converts from optical to electrical and combines the packets of two or more wavelengths if they have the same next-hop router or the same termination router destination. Wavelengths that are not intended for the same destination, and/or wavelengths that are utilized to a given threshold are not converted to electronic before the decision is made to combine them. A next-hop router is the router which is connected with an optical link to the router in question. A termination router is the router where the packet leaves the optical network of FIG. 1. Thus in FIG. 1, if router 107 was a termination router, then at router 101 only wavelengths destined for router 107 would be considered for combining together. Other wavelengths destined for other parts of the network would be sent over other links, e.g., OL 106. At router 107 capacity comparator controller 108 controls whether or not packets received over the wavelengths on OL 105 can be combined for transmission over OL 110 or 111. Capacity comparator controller 108 also performs the same function for the packets received over the wavelengths on OL 109. While the capacity controllers 104 and 108 are shown as separate units they would, more typically, be made part of the routers 101 and 107, respectively, as shown in FIGS. 3 and 4 as described in later paragraphs.

Typically, each OL carries one or more optical wavelengths, each wavelength, for example, having a capacity of several Mbps to several Gbps or more. In the current internet, the primary network level protocol is the Internet Protocol (IP), which is based on datagram and is inherently unreliable. The protocol on the top of (IP) is the Transmission Control Protocol (TCP) is reliable and makes up for the unreliability of IP. In an optical internet (OI), IP packets may be transported on Synchronous Optical Network (SONET), and/or on Asynchronous Transport Mode (ATM) which is the link and/or link and physical layer. These layers each occupy a portion of a particular wavelength in a Wave Division Multiplexer (WDM), or Dense WDM (DWDM). Providing IP in an OI may even be directly carried over separate wavelengths in a WDM optical network without SONET frame structures. In this manner the OI can share optical facilities with a WDM optical network.

FIG. 2 shows a simplified block diagram of an optical router used in FIG. 1 incorporating the apparatus and operating features of our invention. This router 200 may be located at any of the locations 101 and 107 of FIG. 1. Our invention describes a method of and apparatus for estimating the packet capacity utilization for each optical wavelength received over an optical link (or fiber) at a router and for combining packets from two or more wavelengths onto a single wavelength to improve wavelength utilization of the optical links in order to more efficiently meet traffic demand.

More particularly, our simplified router 200 of FIG. 2 includes an optical space switch 201; at least one optical wavelength demultiplexer 202 which demultiplexes the incoming multi-wave input signal from $OL_i$-IN, i=1, 2, . . . , K (205) into its component wavelengths $\lambda_1, \lambda_2, \lambda_3$; a set of wavelength changers 203 which convert an input optical signal of any wavelength to an output signal of an assigned wavelength; and at least one output optical multiplexer unit 204 which combines the wavelengths from wavelength changers 203 into a single multiwave optical link output, $OL_1$-OUT 206. The router 200 also includes a capacity comparator controller which includes capacity utilization estimator (CUE) 250 and a packet combiner 240 which operates under control of an algorithm which, illustratively, may be incorporated as part of optical unit controller 230 or system controller 260. Before converting the entire optical signal to electronics, a tap at the CUE samples the optical signal and converts to electronic only a small portion of the optical signal. The entire optical signal is converted only after it is determined that packets of different wavelengths can be combined. The capacity utilization estimator 250 estimates a packet capacity utilization level or factor for each optical wavelength $\lambda_1, \lambda_2, \lambda_3$ at router 200. The optical unit controller 230, in response to utilization factors received from the capacity utilization estimator 250 uses an algorithm (FIGS. 9a–9c) to determine how best to combine packets from two or more wavelengths onto a single wavelength to improve wavelength utilization in the router 200. The packet combiner 240 is implemented, illustratively, using an electronic signal router, which connects to space switch 201 and which includes optical/electrical (O/E) and E/O converter circuits and an electronic time division multiplex (TDM) switch 247 (or other fabric packet switch) which enables packets from one wavelength to be combined with packets from another wavelength. The switch 247 is used to select packets received on different wavelengths (on the same or different optical links), but which are headed to the same next-hop router (or destination router), and combine these selected packets together onto the same wavelength. Additionally, packets received on the same wavelength but headed to different next-hop routers are switched so that all packets headed to the same next-hop router are combined together on the same wavelength. To optimize its packet combining capability, system controller 260 keeps track of next-hop router/wavelength assignments to ensure both the availability of wavelengths and the availability of capacity on these wavelengths. System controller 260 communicates with the Network Management and Control and optical unit controller 230 to coordinate packet cross-connects made in TDM or packet route selection made in switch 247 and wavelength assignments made in optical space switch 201.

In the illustrative example depicted in FIG. 2, the capacity utilization of input wavelength $\lambda_1$ is determined by capacity utilization estimator 250 to be at a sufficient level and is switched by space switch 201 to the 80 $_1$ output port and to wavelength converter 203. The capacity utilization of wavelengths $\lambda_2$ and $\lambda_3$, however are determined to be underutilized and are switched to the electronic signal router 247. Controller 230 signals system controller 260 to enable electronic router 247 to combine the packets from wavelength $\lambda_3$ with the packets on wavelength $\lambda_2$. The combined packets on wavelength $\lambda_2$ are then switched via space switch 201 to the $\lambda_2$ output port. In this manner the packet capacity utilization of wavelength $\lambda_2$ is increased (equals the combined utilization of $\lambda_2$ and $\lambda_3$) and outgoing wavelength $\lambda_3$, 291, is made available to handle other outgoing traffic at router 200. It should be noted that if the utilization factors are low enough then the packets of more than two wavelengths can be combined onto a single wavelength.

With reference to FIG. 3, there is shown a more generalized block diagram of our optical router 200. The function of the router 200 is to establish paths between inputs $OL_i$-IN, i=1, 2, . . . , K (205) and outputs $OL_1$-OUT through $OL_K$-OUT(206) using optical cross-connect fabric. More particularly, the router of FIG. 3 consists of a cross-connect fabric that includes an optical (NK+O) by (NK+L) space switch (201); a set of K optical wavelength demultiplexers, $DMU_1$ to $DMU_K$ (202) which demultiplex the incoming multi-wave input signal from $OL_i$-IN, i=1, 2, ..., K (205) into its components $\lambda_1, \lambda_2, \ldots \lambda_N$; a set of NK wavelength changers (203) which convert an input optical signal of any wavelength to an output signal of an assigned wavelength; and a set of K output optical multiplexer units $OMU_1$ through $OMU_K$ (204) which combine up to N incoming wavelengths $\lambda_1, \lambda_2, \ldots \lambda_N$ into a single multiwave optical link output, $OL_1$-OUT through $OL_K$-OUT (206). In addition, space switch 201 includes O single-wavelength input ports (210) and L single-wavelength output ports (220). The space switch 201 allows switching of input and output wavelength channels in the order of few milliseconds or less. The optical router 200 operates under control of optical unit controller 230 and under control of a system controller 260.

The system controller 260 receives all of the estimates of capacity utilization information for wavelengths on each incoming optical link to router 200 from the capacity utilization estimator 250 without converting the entire optical signal to electronics. The system controller 260, using the algorithm of FIGS. 9a–9c, can then determine how to combine the packets of underutilized wavelengths from either the same optical link or from different optical links, as long as they have the same destination. The system controller 260 would then signal the electronic switch 245 and optical switch 201 to accomplish the combining of packets from those underutilized wavelengths.

It should be pointed out that FIG. 3 shows the functionality of the optical router 200 and there are many ways to implement this functionality. For example, one may change the position of the wavelength interchangers 203 and the space switch 201 (see FIG. 4); or may have wavelength changers 203 on both sides of the space switch; or may partition the space switch fabric 201 to a plurality of smaller switch fabrics.

Shown in FIG. 4 is one such alternate embodiment of space switch 201 where a group of dynamically assignable wavelength interchangers 401 are used instead of the dedicated one 203 in FIG. 2. Each of the wavelength interchangers 401 can have its connection assigned by optical controller 230 to any input wavelength that has to be changed to another wavelength(s) prior to being outputted from router 200.

It should be noted that the variations in the embodiment of space switch 201 does not affect the techniques used in our invention. Additionally, it should be noted that the functionality of the optical router 200 is independent of (transparent to) the bit rate, signal formal, protocol, or any other electrical characteristics of the data that are carried by the optical signals. Thus the internet protocol (IP), or any other protocol of any speed is accommodated by the present invention.

Returning to FIG. 2, the general operation of the router 200 is now described. The multi-wavelength signal on the K incoming optical links $OL_1$-IN through $OL_K$-IN (205) are demultiplexed 202 (passively, in this case) into its component wavelengths and are routed to a subset, NK of NK+O input ports of the space switch fabric 201. The switch fabric 201 is, functionally, a strictly non-blocking (NK+O)×(NK+L) optical space switch which can route (cross-connect) any of its (NK+O) inputs to any of its (NK+L) output ports.

In addition, the space switch 201 has L additional un-multiplexed output ports 220 (in FIG. 3). These output ports are controlled by optical unit controller 230 to cross-connect the under-utilized wavelengths at the inputs NK of space switch 201 to the electronic signal router ( also referred to as an electronic packet combiner).

The router 200 also includes an electronic signal router 240 shown illustratively to include optical/electrical (O/E) and E/O converter circuits, 242 and 243, respectively; a plurality of electronic demultiplexers 244; an electronic time division multiplex (TDM) or other electronic switch fabric 245: and a plurality of electronic multiplexers 246. The electronic packet combiner 240 under control of controller 241 and system controller 260, as previously described, performs the combining of the packets of the under-utilized wavelengths of an OL 205 into a single wavelength. Note, that the algorithm can be modified to enable underutilized wavelengths from different OLs, which are destined to the same terminating router, to be combined on one or more wavelengths of one OL. After the packets of the under-utilized wavelengths are combined by electronic packet combiner 240 onto a single wavelength optical signal, that repacked wavelength signal is connected to one of the 0 inputs 210 for routing through switch fabric 201. Each of the 0 inputs 210 is then switched by optical unit controller 230 to cross-connect to the appropriate one of the outputs NK of switch fabric 201.

An important point implied by FIG. 2 is that the functionality of the optical router 200 is independent of (transparent to) the bit rate, signal formal, protocol, or any other electrical characteristics of the data that are carried by the optical signals. Thus the internet protocol (IP), or any other protocol of any speed is accommodated by the router 200.

In the following description, the total transmission capacity at a wavelength $\lambda_i$ is denoted by $\lambda_i$. We denote the actual measured transmission rate over the observation interval T at wavelength $\lambda_i$ as $M_i$ ($<C_i$). When $M_i \approx C_i$, that is, measured transmission rate at wavelength $\lambda_i$ is approximately equal to the total transmission capacity, the optical channel is fully utilized. When $M_i << C_i$ (much smaller), the optical channel is not fully utilized. Our invention provides a mechanism and apparatus for detecting optical wavelength channels that are not fully utilized (before converting the entire optical signal to electronic), then converting the signal back to electronic data packets, combining together the data packets from two or more low utilization wavelength channels, and remultiplexing and transporting the combined signal (at a higher channel utilization rate) over one or more of the wavelength channels. Since only under-utilized channels rather than all of the channels were converted to electronics, then, at most, only those under-utilized channels need to be converted back to optical (using lasers), this greatly reduces the cost and complexity of our router.

With reference to FIG. 3, for a particular input optical link, e.g., $OL_{1-IN}$, the capacity utilization estimator 250 determines which, if any, of the optical wavelengths $\lambda_1, \ldots, \lambda_N$ appearing on terminals 1 ... N of the demultiplexer are under-utilized. The capacity utilization estimator 250 signals this information to the optical unit controller 230 which uses the algorithm of FIGS. 9a–9c to select which of these under-utilized wavelengths can have their packets combined onto a single wavelength. The optical unit controller 230 signals the system controller 260 with this information and the system controller 230 signals the electronic unit controller 241 of electronic switch router 240. These under-utilized wavelengths on input terminals 1 ... N are connected via space switch 201 to the output terminals NK+1, ..., NK+L, designated as wavelengths $\lambda'_1, \ldots, \lambda'_L$, and are connected to electronic switch router 240. At electronic switch router 240 the wavelengths $\lambda'_1, \ldots, \lambda'_L$ are converted to electronic TDM signals by O/E converters (optical detectors) 242, the signals are then demultiplexed, the demultiplexed signals of selected ones of the wavelengths $\lambda'_1, \ldots, \lambda'_L$ are then combined, then re-multiplexed together, converted to one of the optical wavelengths $\lambda''_1, \ldots, \lambda''_O$ by E/O converters 243, and connected to input terminals NK+1, . . . NK+O of space switch 201. As described above, the electronic unit controller 241 of electronic switch router 240, in response to control signals from system controller 230, controls how the packets from under-utilized wavelengths are to be re-packaged together and on which wavelength the resulting combined packet signal is to be modulated. In the manner above described, the electronic switch router 240 together with optical unit controller 230 and system controller 260 coordinate their operation to handle the repacketizing of wavelengths on any of the optical links 205.

Determining Optical Channel Capacity

In accordance with our invention, we determine the actual capacity of an optical wavelength $\lambda_i$, $C_i$; (if not already known) using the following method. Using the passive coupler tap 501 (FIG. 5), a fraction of the optical signal is derived by CUE 250. The resulting signal is converted to electronics using the optical detector diode 502. At the start of a digital transmission at wavelength $\lambda_i$, a timer is started and the number of digital pulses over a predetermined interval $\tau_i$ is measured. Immediately, at the end of packet/message transmission which is denoted by no channel activity right after packet/message transmission, measurement halts and the number of digital pulses $\xi^{\tau i}$ well as the length of the timer interval $\tau_i$ over which the measurement was performed are recorded. Capacity $C_i$ of the wavelength $\lambda_i$ can be approximated by the system controller 260 as follows:.

$$C_i = \xi^{\tau i}/\tau_i$$

This value is subsequently used by the system controller 260 in order to determine whether that optical wavelength signal should be fully converted to electrical signal and re-multiplexed with signals from other under-utilized wavelengths or maintained as an optical signal and transported by the router. The signal selected on the optical wavelength for monitoring and determining the capacity of the line is arbitrary, and the length of monitoring referred as "learning interval" ($\tau_i$) is equal to the transmission duration of a packet. The length of this interval depends on the capacity of the channel. For example, a packet of 1000 bits at channel capacity of 1 Mbps should be monitored over t≡1 milli seconds while this same packet at a channel capacity of 1 Gbps (equivalent to 1000 Mbps) should be monitored over t≡1 micro-seconds. The task of determining the capacity is only performed once for each wavelength.

Criteria for Combing Packets from Different Wavelengths

It is preferred that the optical wavelength channels are monitored frequently enough so that wavelengths with under-utilized channels can be identified, remultiplexed with packet signals from other channels, and their corresponding wavelengths freed up for other connections. Thus at a given router, we need to identify those wavelengths $\lambda_k$ for which $M_k \ll C_k$ (i.e., channel rate is much less than channel capacity) and thus their traffic should be re-allocated/remultiplexed (or combined with) traffic from other under-utilized optical channels at other wavelengths, and the deallocated wavelengths freed up and made available for new output connections at the router.

If the choice of the observation interval T (see FIG. 7b), is too short, the reallocation of packets among wavelengths can become too frequent and may possibly reduce performance for active connections at the wavelengths involved. In order to identify the under-utilized channels and to reconfigure optical space switch 200, first $T_i$ (for wavelength channel $\lambda_i$) is determined and then the following steps are performed:

(1) We consider a threshold ($\eta^*$) as an acceptable channel utilization threshold for a given wavelength. In practice $\eta^* \equiv 0.70$, but other values can also be used.

Figure 5:
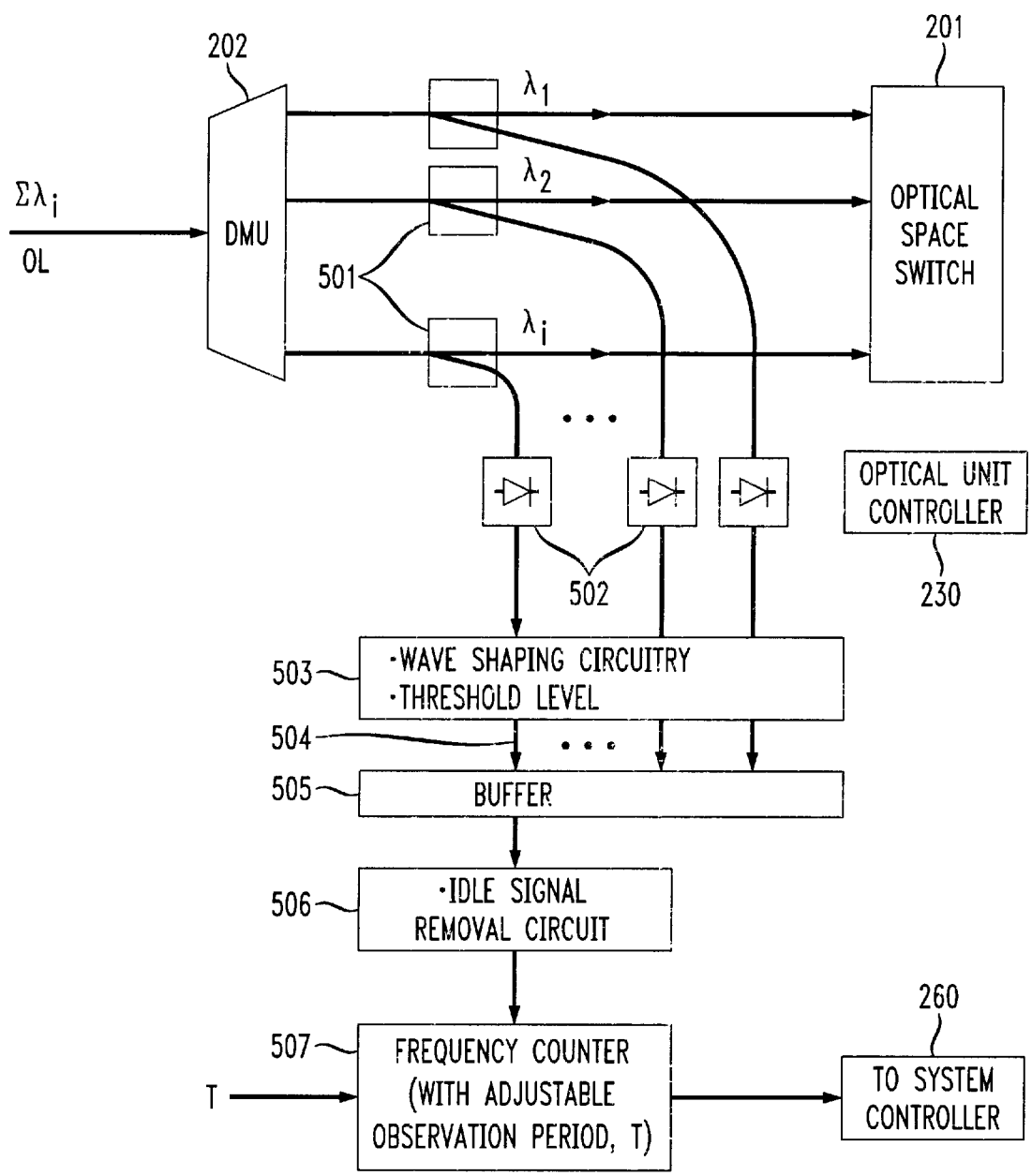
FIG. 5 shows a first illustrative embodiment of our capacity utilization estimator for use in the optical router of FIG. 2.

(2) For the wavelengths $\lambda_i$, i=1, 2, . . . , I, and over the observation interval $T_i$ the number of pulses $\xi^{Ti}$ are measured with the capacity utilization estimator (FIG. 5). That is:

$$M_i = \xi^{Ti}/T_i, i=1, 2, \ldots, I$$

Recall that over a learning interval $\tau_i$, we have already measured the channel capacity in the optical domain. Channel utilization for wavelength $\lambda_i$ is:

$$\eta_i = M_i/C_i, \text{ and}$$
$$\eta_i = \xi^{Ti}/\xi^{\tau} \cdot \tau_i/T_i, i=1, 2, \ldots, I$$

(3) All wavelengths with $\eta_i < \eta^*$ are ordered as follows:

$$\eta_1 < \eta_2 < \eta_3 < \eta_4 < \ldots \eta_i < \eta^*$$

(4) Wavelengths with utilization factors at, about, or above $\eta^*$, remain unchanged and are connected through the optical space switch 201 (such as $\lambda_1$ in FIG. 2).

Figure 9A:
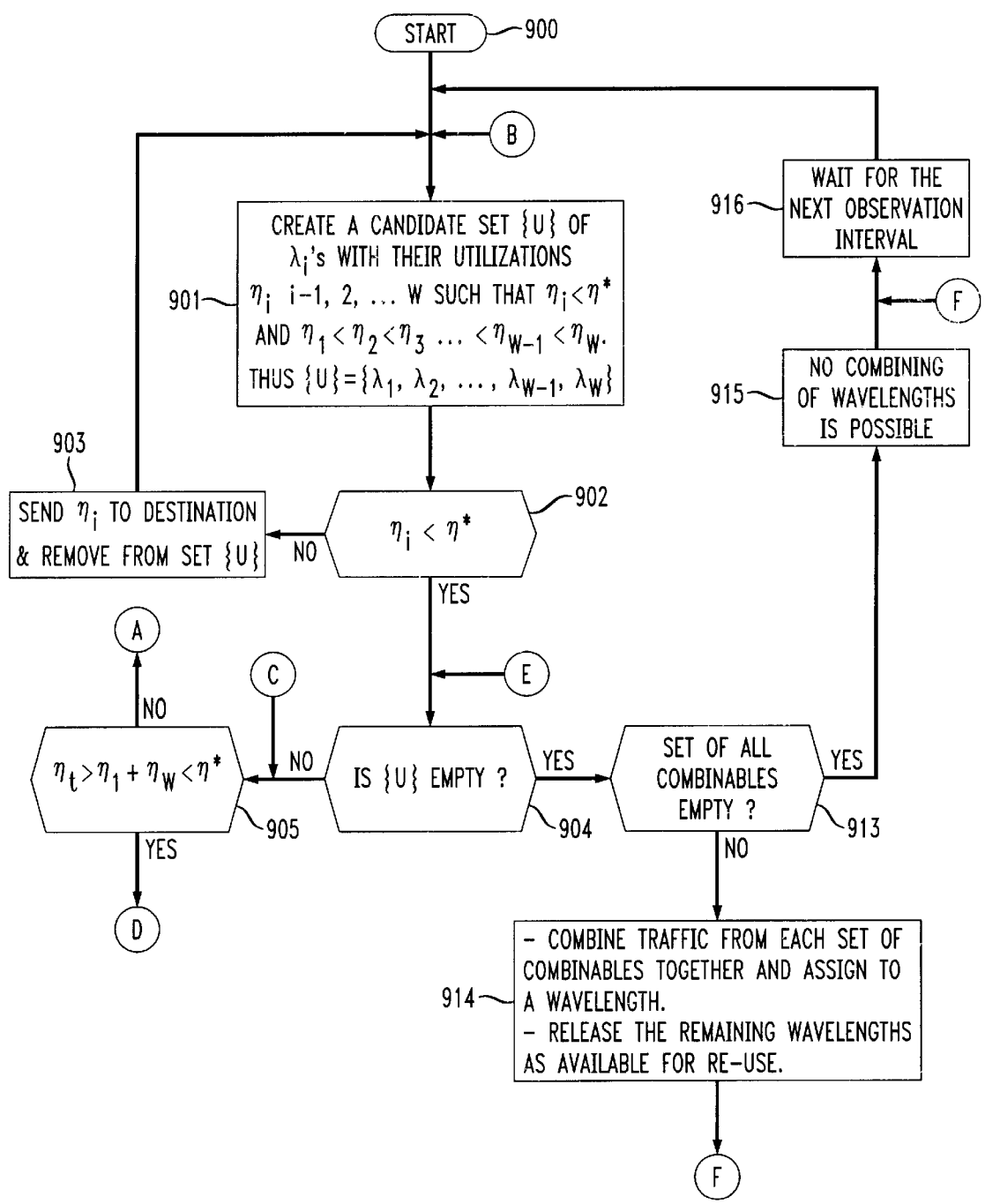
FIGS. 9a through 9c show, in accordance with the present invention, an illustrative flow chart of our illustrative wavelength packing algorithm for controlling the selection of underutilized wavelengths which are to have their data packets combined onto a single wavelength.
Figure 9B:
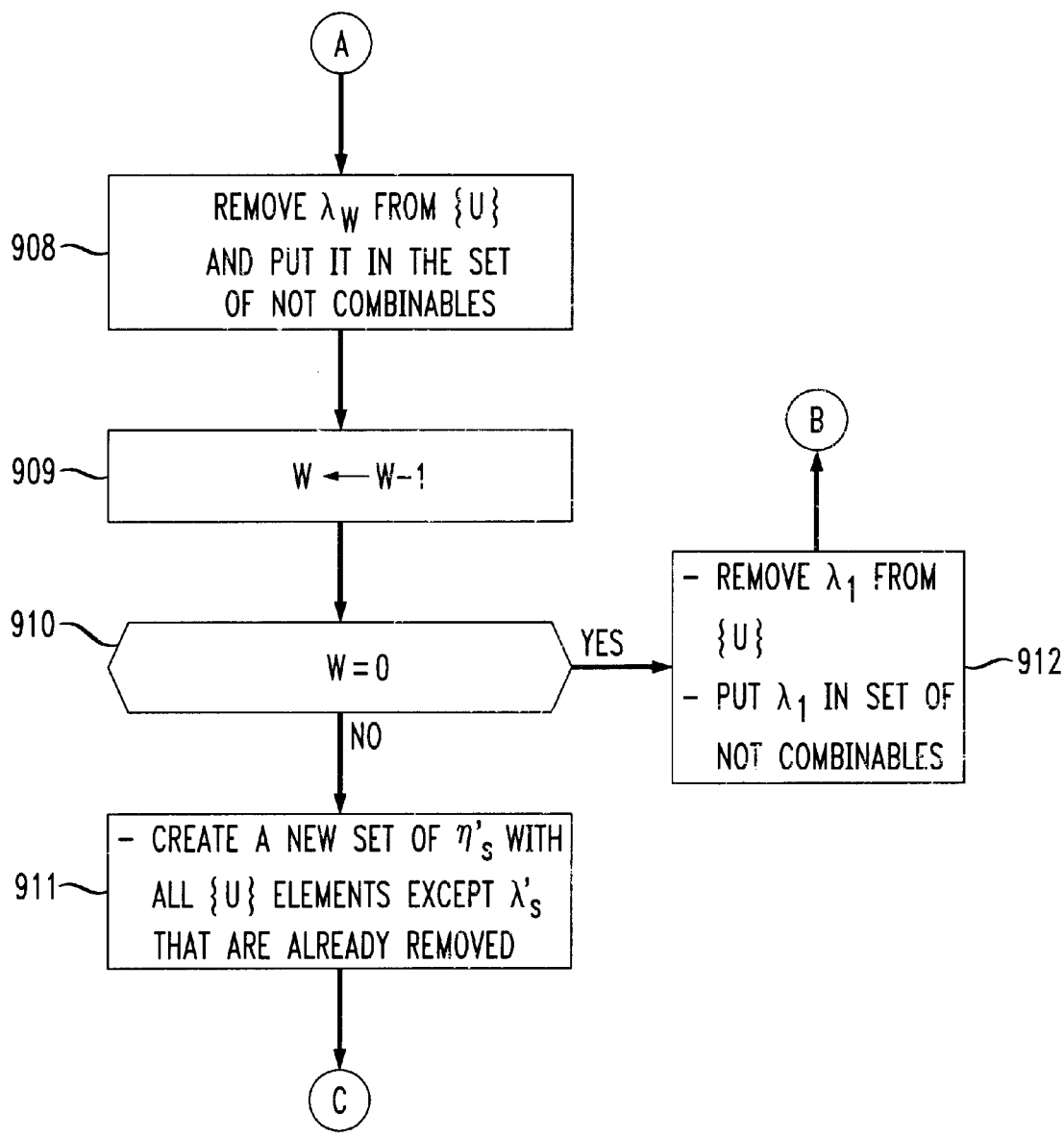
Figure 9C:
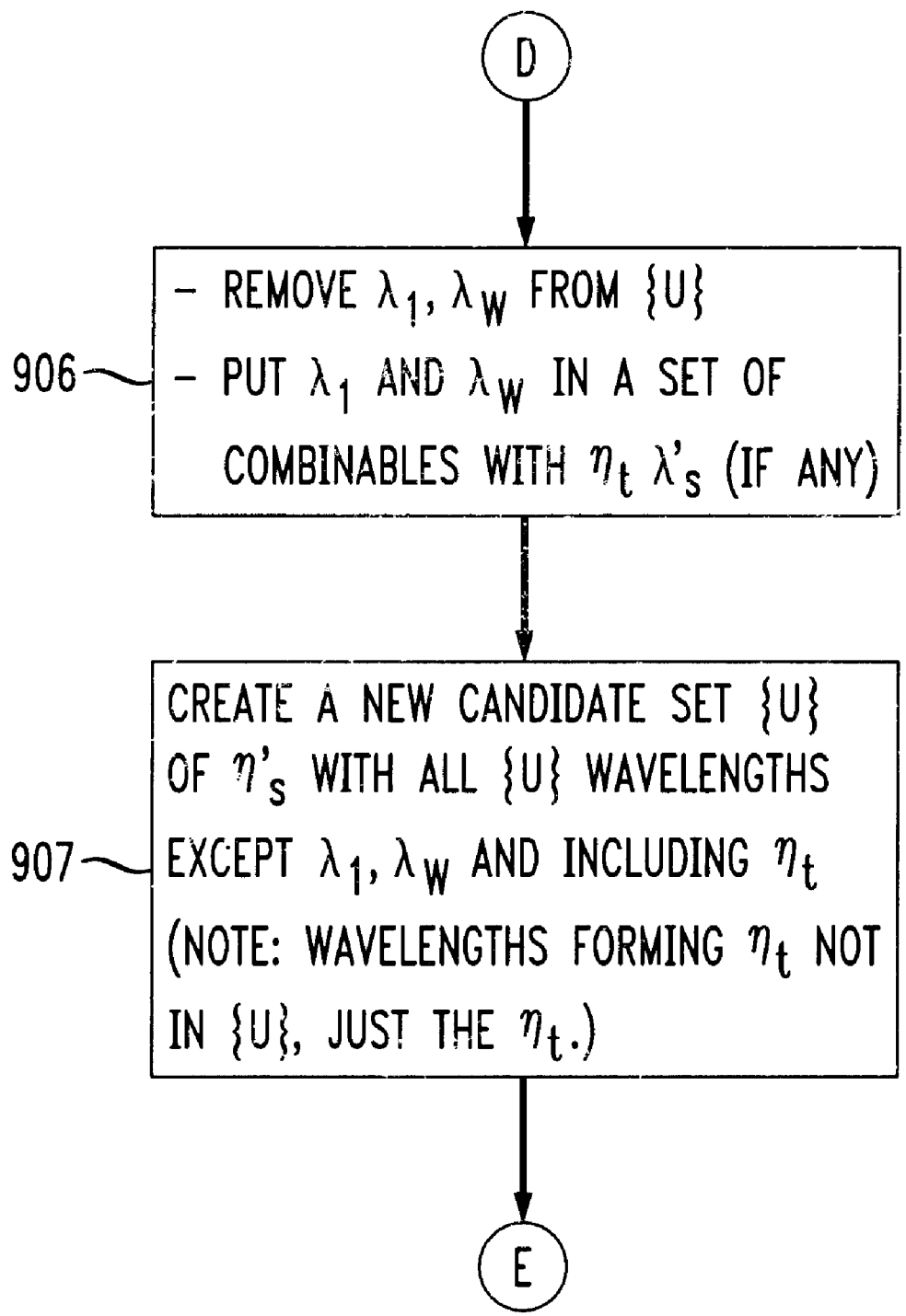

(5) In order to determine which wavelengths will be re-combined after demultiplexing, we use, illustratively, the algorithm shown on flow chart in FIGS. 9a–9c. Other algorithms may also be utilized for this purpose.

The "observation interval," T, corresponds to the length of time over which each wavelength is monitored for channel activity purposes. If T is very large, then the measured activity at a particular wavelength does not represent a useful measure of the real traffic. This is because we wish to respond to traffic fluctuations in a rapid manner rather than after the fact. On the other hand if the interval is chosen to be very small (on the order of a packet transmission time), it will represent an unrealistic measure of traffic at that wavelength. The choice of the observation interval T is important and must be selected using preferably a dynamic method embodied with a possible correction technique. The wrong choice of T will not hinder the operation of the optical router 200, however, it can result in poor performance for the connections using those wavelengths. Since we are interested in wavelength allocation in order to improve performance of active connections on the channel, an obvious choice is $T \gg \tau_i$. It should be clear that the choice of T depends on the channel capacity. A larger T is required for lower channel capacities (to insure sufficient pulses are encountered), while a smaller T is required for channels with higher capacities. Generally, the choice of T is about an average connection time, such as 3 to 5 minutes for voice, one hour for video, etc.

As described we must determine the utilization (i.e. how fully a wavelength channel is loaded) at each wavelength channel of a multiwavelength input optical fiber 205 to optical router 200. It is further desirable to achieve this goal without converting the optical signals to electrical signals and fully demultiplexing all wavelength channels into the constituent data (packets) before deciding whether demultiplexing of packets on a wavelength and remultiplexing at a different wavelength is necessary.

The method of monitoring the various wavelengths is shown in FIG. 5. A passive coupler 501 taps off a fraction of the wavelength signals $\lambda_1, \ldots, \lambda_i$ and detector 502 converts the optical signal to an electronic signal. This avoids conversion of the main optical signal before deciding whether the packets of that wavelength can be multiplexed together with the packets of another wavelength. The reason for avoiding conversion to an electronic signal is the possible delay (slight as it may be) that is introduced in optical-electrical-optical (O-E-O) conversions and electronic switching. Another reason is cost: (1) since it is expensive to do the E-O conversion (since accurate laser are expensive) portion of the O-E-O conversion, and (2) since electronic switch cost increases with size. Since only under-utilized channels are converted to electronic the cost is greatly reduced because fewer lasers are needed for E-O conversion and a smaller electronic switch is needed.

Capacity Utilization Estimator (CUE)

As described above, there are essentially two parameters that determine the utilization of each wavelength channel on the optical fiber: The highest bit rate that data can be transmitted (i.e. channel capacity FIG. 7a), and how closely (or sparsely) the packets are located (the packet packing density, see FIG. 7b).

Figure 7A:
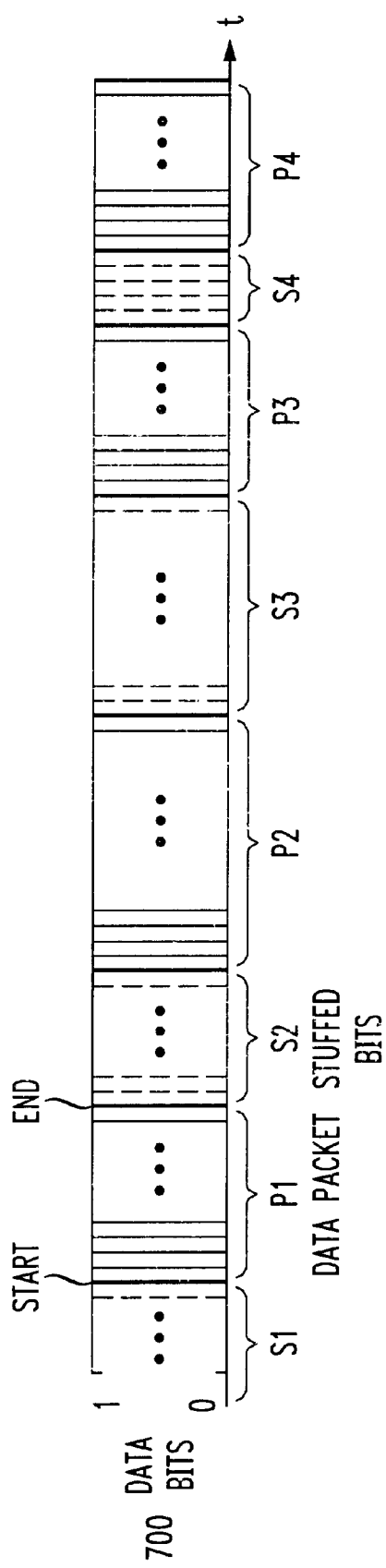
FIG. 7a shows an illustrative optical waveform of a single-wavelength channel including idle bits and FIG. 7b shows the electrical waveform after the removal of the idle bits and an illustrative timing diagram for the capacity utilization estimator of FIGS. 6a and 6b.
Figure 7B:
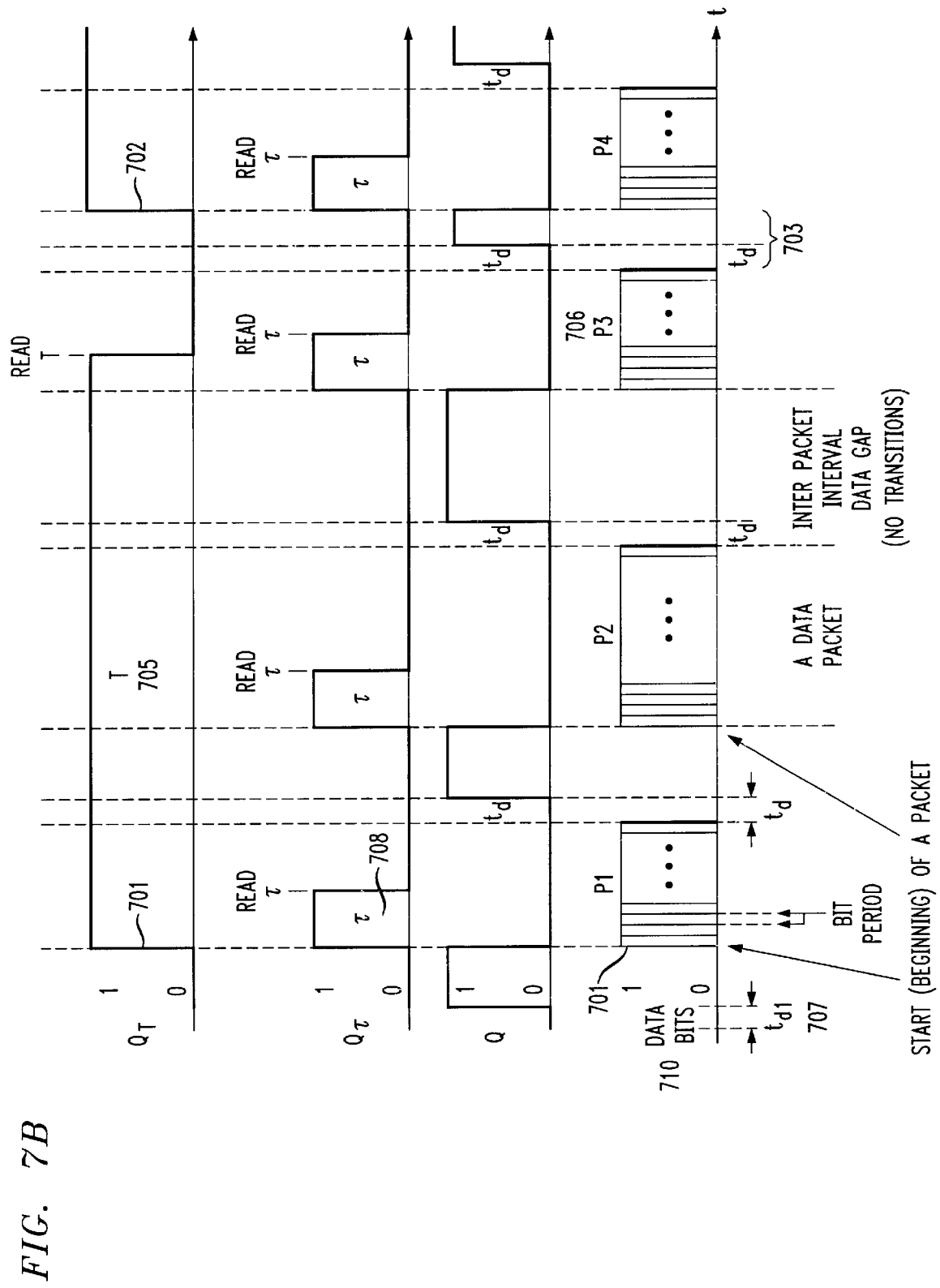

With reference to FIG. 7b, there is shown a typical data packet transmission in electrical or optical domain, the signal bit rate (inverse of a bit period) is estimated by the number of pulses in the learning period T (708). Knowing this bit rate, we determine the data packing density (packet utilization factor), or how closely the data packets are arranged by making a second measurement. That measurement produces the number of pulses that are counted (i.e., how many bits are sent) in an observation period T (705). As shown in FIG. 7a, we note that electrical/optical packet signals, e.g., P1–P4, on a transmission line are "stuffed" or interspersed possibly with "idle signals," e.g., S1–S4. Usually idle signal bits S1–S4 are used mainly for maintaining synchronization between transmitter and receiver. As shown in FIG. 7b, these idle signals S1–S4 are removed so that the frequency counter measures the pulses corresponding to only the packet data signals that are being transmitted.

In general $\tau<<T$ Additionally, $\tau$ is made less than the smallest packet length 706. As a result, the measurements of T is made to start at the beginning of a data packet (701 of FIG. 7b). As shown in FIG. 7b, the beginning of a data packet 701, is determined by the receipt of a data bit (the first pulse of a packet) following observing a period $t_d$, e.g., 707, of inactivity on the line, where td is less than the minimum distance 703 expected between data packets. Counting the number of bits (pulses) during the interval $\tau$, following the beginning of a data packet, gives an estimate of the packet signal bit rate.

Figure 6A:
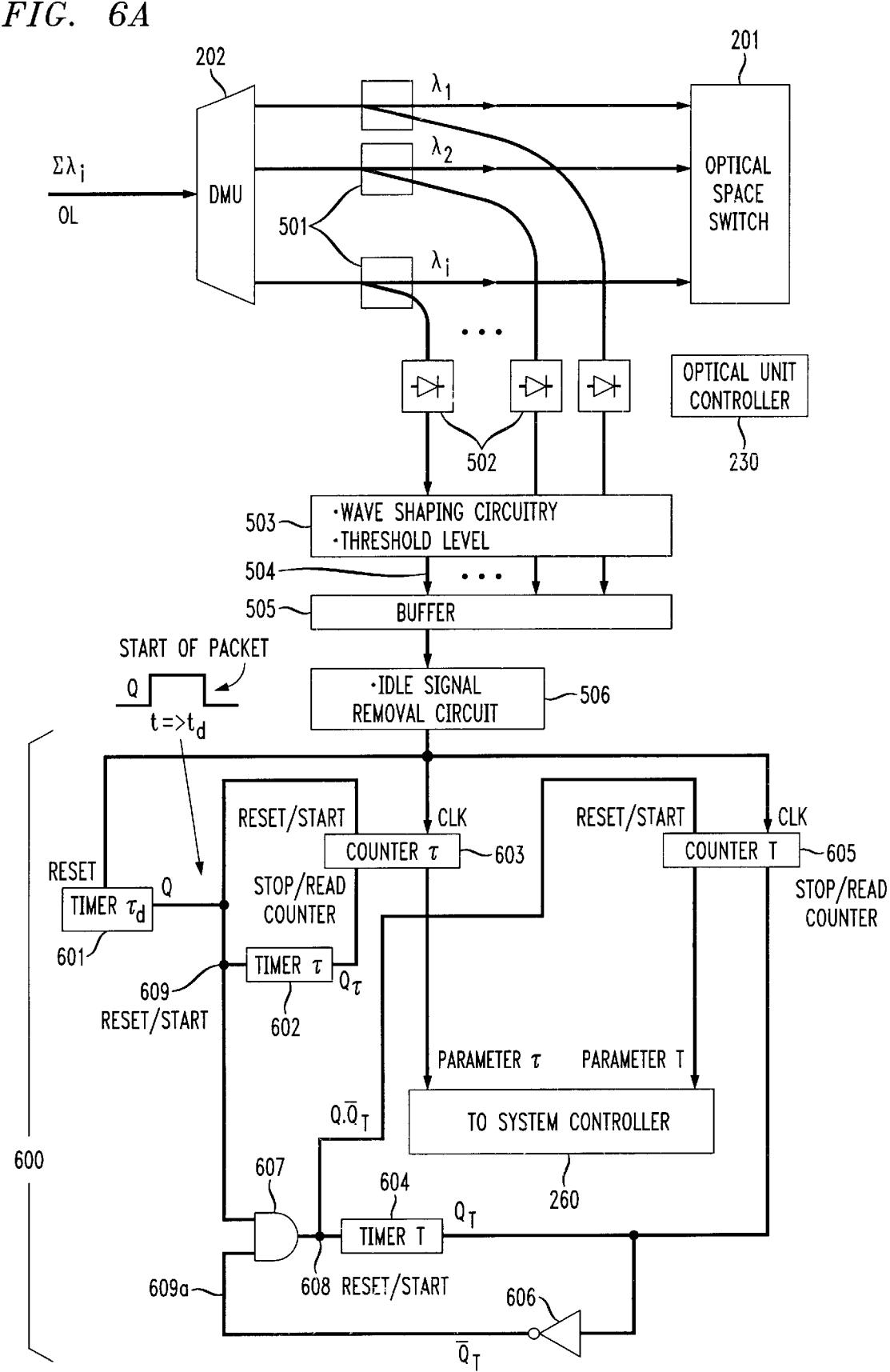
FIGS. 6a and 6b show, respectively, a second and third illustrative embodiment of our capacity utilization estimator.

Shown in FIGS. 5 and 6a are two illustrative embodiments of our capacity utilization estimator 250 for use in the optical router of FIGS. 3 and 4. FIG. 5 shows a first illustrative embodiment including a plurality of broadband optical couplers 501 connected to the outputs of each optical demultiplexer 202 (or inputs to multiplexer 204) of FIG. 2. Each coupler 501 transfers a small portion (such as 1 percent) one of the optical wavelength signals $\lambda_1, \ldots, \lambda_N$ to an associated optical/electrical (O/E) converter (or photonic detector) 502 which detects the electrical modulating signal. The resulting electrical signals from all of the wavelength signals $\lambda_1, \ldots, \lambda_N$ are then processed by a shared front end processor 503 which may include, e.g., a filter, a threshold circuit, and a pulse detector. The resulting signal is an electrical binary signal similar to that shown in FIG. 7a. The processed electrical signals 504 from common front end processor 503 are buffered in buffer 505, and the idle signal removed by shared removal circuit 505, and counted in shared frequency counter 507 after removing the idle signal 506. While the common front end processor 503, removal circuit 505, and counter circuit 507 are shown as being shared among the plurality of processed electrical signals, obviously separate circuits could be used for each of the processed electrical signals 504 (thus buffer 505 is not needed). In the following description it is assumed that the utilization estimator uses shared common front end processor, removal, and counter circuits.

FIG. 7a shows a typical output binary signal from front end processor 503 for a received single-wavelength channel optical signal. As shown, the idle intervals S1–S4 between packets P1–P4 are "stuffed" with idle bits. The illustrative electrical signal output of idle bit removal circuit 506 is shown by 710 in FIG. 7b. As shown, once the idle bits are removed the frequency counter may use the signal transition 701 from no signal to the first signal bit of a data packet as a start or reset signal for the counter 507. The counter 507 first looks for a preceding inactive period of duration td 707, before looking for a transition 701. The counter circuit 507 has variable observation times $\tau$ (730) and T (705). The counter 507 then counts data bit (from pulses) in the "observation intervals" $\tau$ and T. As shown, the observation interval T, 705, is long enough to extend over several data packets, e.g., P1 and P2.

With reference to FIG. 6a an alternative embodiment of a capacity utilization estimator 250 is shown. The block diagram of FIG. 6a is the same as FIG. 5 except that the frequency (pulse) counter 507 is replaced by the counter circuit 600. The frequency counter circuit 600 includes a $t_d$ interval timer 601, a $\tau$ interval timer 602, a counter 603, a T interval timer 604, a counter 605, an inverter 606, and a reset gate 607. With joint reference to FIGS. 7b and 6a we describe the operation of bit counter 600. When the start of a data packet 701 is detected following a quiet time period $t_d$, 707, a Start/Reset signal 609 (Q of FIG. 7b) from timer 601 is generated which starts timers 602 and 604 and resets counters 603 and 605. The $\tau$ interval counter 603 is reset when Q of FIG. 7b goes high (logic 1) and starts to count when Q goes low (logic zero). Similarly, T interval counter 604 resets when Q is high and $Q_T$ is low and then starts to count after Q goes low (702 of FIG. 7b). Note that T interval timer 604 is started only if the timer 604 has already expired, $Q_T$ is low, as indicated by a logic one signal on lead 609a. Thus with reference to 720 and 740, note that the T interval timer 740 is reset by the Start/Reset signal 609 from timer 601(shown by Q of FIG. 7b) only if it has expired (e.g., $Q_T$ is already low, 702 ) and not if $Q_T$ has not expired (e.g., $Q_T$ is high).

The counter 603 counts the number of pulses in the packet until the timer 602 generates a Stop/Read signal after time interval. The resulting count is called the parameter $\tau$ which is outputted to the system controller 260 (via optical unit controller 230). At the same time, counter 605 is counting packet pulses received until the timer 604 generates a Stop/Read signal after time interval T. Since T extends over a plurality of packets 705, the counter 603 indicates the average bit utilization or occupancy rate for the electrical signal being monitored. The resulting count is the parameter T which is also outputted to the system controller 260 (via optical unit controller 230). Note that inverter 606 and gate 607 prevent a Start/Reset signal 609 at the beginning of a packet from resetting the timer 601, unless the T timer 604 has expired (i.e., at time 702 of FIG. 7b).

Figure 6B:
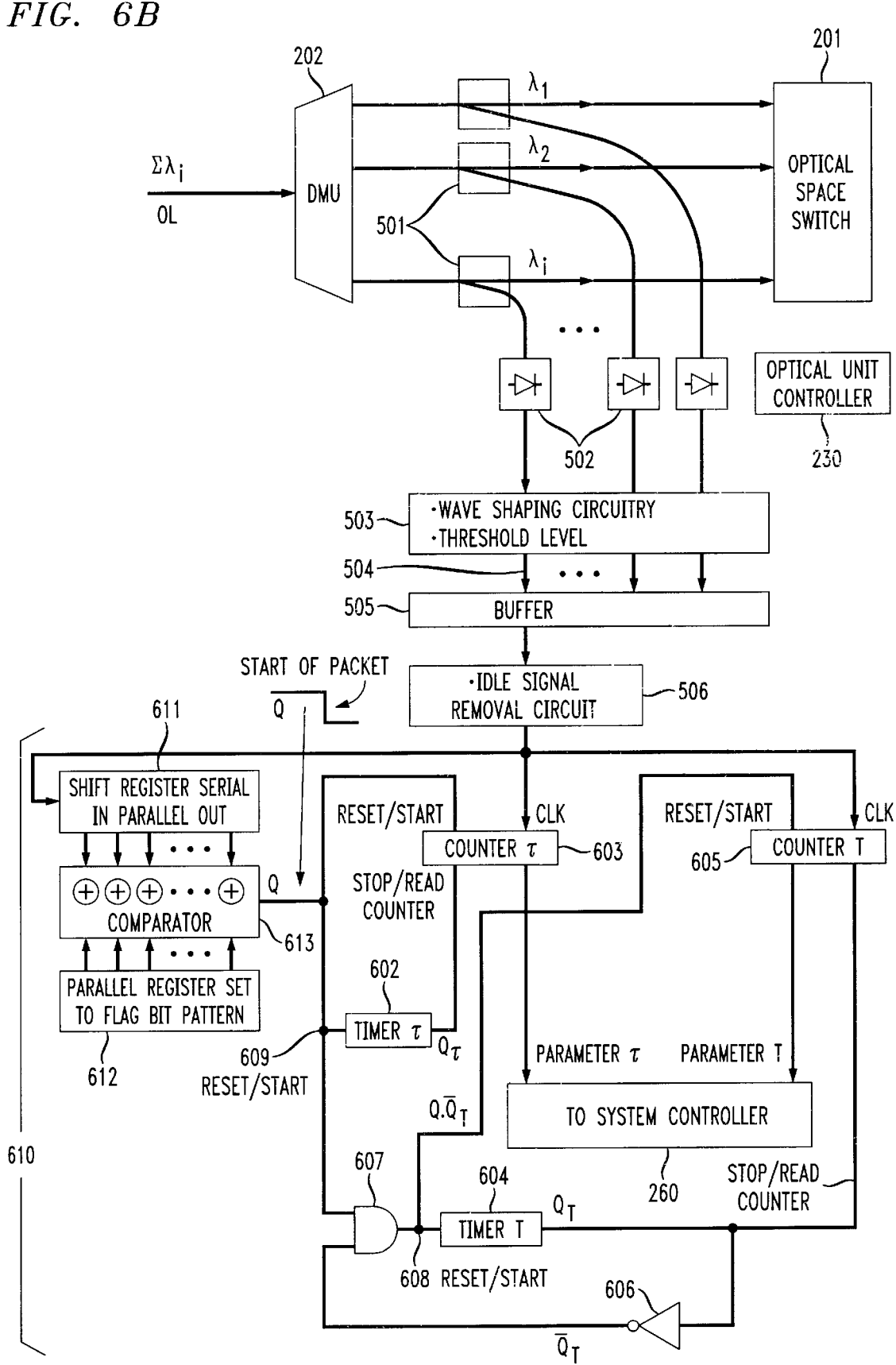

With reference to FIG. 6b there is shown another embodiment of a capacity utilization estimator 250. The block diagram of FIG. 6b is the same as FIG. 6a except that the counter circuit 610 includes a flag detector circuit 611–613 instead of the idle $t_d$ interval timer 601 used in counter circuit 600 of FIG. 6a. As shown in FIG. 8, the data packet may include a start flag indicating the beginning of a packet. Thus, flag detector circuit 611–613 generates a Restart/Start signal 609 based on the detection of a start flag and not on the detection of an idle interval $t_d$ as is done by timer 601. The shift register 611 receives the data packet bits. The register 612 has prestored therein the known start flag pattern for the data packets. The comparator 613, e.g., an exclusive-or circuit, is used to compare the received bit pattern in register 611 with the known start flag pattern in register 612. When the start flag is detected by comparator 613, the Reset/Start signal 609 goes from a logic one to a logic zero state. Thereafter, the rest of the operation of counter circuit 610 of FIG. 6b proceeds in the same manner as previously described for counter circuit 600 of FIG. 6a.

The circuitry of frequency counters 507 of FIG. 5, 600 of FIG. 6a, and 610 of FIG. 6b can be implemented using digital electronic circuitry, or alternatively by a microprocessor under software control. Similarly, these counting functions may be implemented by using a set of phase locked loop (PLL) circuitry.

Alternatively, it should be noted that in FIGS. 5 and 6, the plurality of O/E converter 502 may be eliminated and one O/E converter 502 may be shared among the N single optical lines by using a 1×N optical switch. Illustratively, such an arrangement can be implemented by connecting the one O/E converter 502 component to an unused port of the space switch 201 of FIG. 3 (e.g., output NK+L) which can be selectively switched by controller 230 to connect to the desired optical output channel $\lambda_1, \ldots, \lambda_N$ of demultiplexer 202. In such an arrangement, a bridging capability is needed in optical space switch 200 to enable port NK+L to access other output ports of optical space switch 201. This bridging capability would enable the router 200 to monitor wavelengths that carry the combined packets from other underutilized wavelengths. Note, it may be that one capacity utilization estimator 250 can also be shared among all of the input optical links $OL_i$-IN, i=1, 2, . . . , K (205 of FIG. 3)

Wavelength Packing Algorithm

The wavelength packing algorithm (FIGS. 9a–9c) is designed to combine those channels that are: (a) destined for the same destination cross-connect/router (either in the next hop or the final destination, however implemented) and (b) that are under-utilized. As shown in FIG. 8, the packet destination address information is part of the data packet.

The algorithm uses three sets defined as follows:

1. Candidate set {U}: This is a set of all the wavelengths (represented by their utilization factors) in the order from smallest to the largest utilization factors and which have measured utilization factors less than $\eta^*$. In each iteration of the algorithm, the set is recreated since some elements (e.g., wavelengths) may be removed and/or their traffic combined with others.

2. Sets of combinable wavelengths {CU}: These are sets of all wavelengths having traffic that can be combined together with the total utilization factor not exceeding $\eta^*$. A separate set is defined for wavelengths that have a utilization factor less than $\eta^*$ and which can be combined together and they have the same destination cross-connect/router. Thus, there can be several sets of combinable wavelengths. Each set consisting of only wavelengths that be combined together when they match the predetermined criteria.

3. Set of non-combinable wavelengths {NCU}: This set consists of those wavelengths that can not be combined since they do not satisfy the criteria stated in the algorithm (FIGS. 9a–9c). Traffic from these wavelengths will be carried unchanged on the original wavelengths and are cross-connected through to the output ports of the cross-connect/router.

With joint reference to FIGS. 9a–9c we describe the operation of the algorithm. From the start state 900, control passes to step 901. In step 901, all wavelengths which have an $\eta$ which is less than $\eta^*$ form the candidate set {U}. Where $\eta^*$ is the threshold defined for efficient wavelength channel utilization (0.7 in our example). The set {U} is arranged with the $\eta$'s in ascending order. There is a one-to-one mapping between channel utilization $\eta_i$ and the associated wavelength and one can be deduced from the other.

In step 902, each $\eta_i$ is checked if it is less than $\eta^*$. If a wavelength has an $\eta_i$ which is more than $\eta^*$, then in step 903 the associated wavelength is removed from the set {U} and the packets of that wavelength cannot be combined with those of another wavelength. That wavelength is then sent to its destination by being cross-connected through to an output port of the router. Control then returns to step 901. If a wavelength has an $\eta_i$ which is less than $\eta^*$, then step 904 is performed.

In step 904 it is determined whether the set {U} is empty. If set {U} is not empty, then in step 905 the algorithm attempts to combine traffic from channels having the lowest ($\eta_i$) and highest ($\eta_W$) utilizations from the set {U}. If the combined utilization factor $\eta_t$ is less than $\eta^*$ then the traffic from wavelengths 1 and W can be combined and control passes to step 906, FIG. 9c. In step 906 the wavelengths 1 and W are removed from the current candidate set {U}. The combined wavelengths are put into a combined set {CU}. Only the wavelengths that can be combined ($\eta_t<\eta^*$) and which share the same destination router are put in combined set {CU}. In step 907, the new candidate set {U} includes the remaining channels $\lambda_2$ through $\lambda_{W-1}$ as well as the new combined channel with utilization $\eta_t=\eta_1+\eta_W$ arranged in ascending order of utilization factors $\eta$'s. Control then passes to step 904, FIG. 9a.

Returning to step 905, if the combined utilization factor $\eta_t$ is not less than $\eta^*$, then the traffic from wavelengths 1 and W can not be combined, and step 908 on FIG. 9c is performed. In step 908 the wavelength W is removed from the candidate set {U} and put into a set of non-combinables and that wavelength is then cross-connected through to an output port of the router.

In step 909, W is set equal to W-1, indicating that $\lambda_W$ is removed from the candidate set {U}. In step 910, if W is not equal to zero then step 911 is performed. In step 911, the wavelength W is removed from the current candidate set {U} (with all the wavelengths except those that have been removed). Step 905 is then performed. Returning to step 910, if W is equal to zero then in step 912 the wavelength $\lambda_1$ is removed from the set {U} and put in the set of non-combinables where wavelength is then cross-connected through to an output port of the router. Control then passes to step 901, FIG. 9a.

Returning to step 904, if set {U} is empty, then in step 913 the algorithm checks if the set of all combinables is empty. If not empty, then in step 914 the traffic from each set of combinable wavelengths are multiplexed on one of the combinable wavelengths. The remaining combinable wavelengths of that set are then freed and made available for reuse at the output port of the router. For example, see 291 of FIG. 2 where the wavelength $\lambda_3$ was made available after its packets were assigned to wavelength 2. Control then passes to step 916. In step 916 the algorithm waits for the next observation window and control returns to step 901.

Returning to step 913, if the set of all combinables is empty, then in step 915 no combining of wavelengths is possible and control passes to step 916

It should be noted that the particular wavelength packing algorithm shown in FIGS. 9a–9c is merely illustrative of our concept of combining the traffic from underutilized wavelengths together onto a single wavelength, other algorithms may be also be utilized in order to obtain the desired results. Thus, what has been described is merely illustrative of the application of the principles of the present invention. Other methods and arrangements can be implemented by those skilled in the art without departing from the spirit and scope of the present invention.

What is claimed is:

1. An optical router for use in an optical router network, said router comprising capacity utilization apparatus for determining a packet capacity utilization level of each of a plurality of wavelengths being received at the optical router and packet combiner apparatus for combining packets from said two or more wavelengths onto one of said two or more wavelengths for transmission from the optical router when a combined determined packet utilization level on said two or more wavelengths is less than a predetermined packet utilization level.

2. The optical router of claim 1 further comprising destination detection apparatus for detecting the destination of packets on each of said two or more wavelengths and wherein said combining apparatus combines packets from said two or more wavelengths onto one wavelength only if the packets have the same destination.

3. The optical router of claim 1 further comprising destination detection apparatus for detecting the destination of packets on each of said two or more wavelengths and wherein said combining apparatus combines packets from said two or more wavelengths onto one wavelength only if the packets have a destination which enables the packets to be routed from the optical router to the same next router of said network.

4. The optical router of claim 1 wherein the plurality of wavelengths received at the optical router are received over a plurality of optical links.5.

5. The optical router of claim 1 wherein said capacity utilization apparatus includes a photonic detector for converting a fraction of an optical signal to an electrical signal and a counter for counting the number of pulses of the electrical signal during a predetermined observation interval.

6. The optical router of claim 5 wherein the capacity utilization apparatus includes an idle signal removal circuit for removing idle signals located between adjacent packets on a plurality of wavelengths being received at the optical router.

7. The optical router of claim 5 wherein the capacity utilization apparatus includes a fractional tap for tapping a fraction of an optical signal of each of the plurality of wavelengths being received at the optical router.

8. The optical router of claim 5 wherein the capacity utilization apparatus includes signal processor for processing the electrical signal prior to input to the counter.

9. The optical router of claim 1 wherein the capacity utilization apparatus includes a photonic detector for converting an optical signal to an electrical signal a counter for counting the number of bits of the electrical signal during a first predetermined observation interval and a second counter for counting the number of bits of the electrical signal during a second predetermined observation interval.

10. The optical router of claim 9 wherein the capacity utilization apparatus further includes a packet detector for detecting the beginning of a received packet and in response thereto for generating a reset signal for the counter and the second counter.

11. The optical router of claim 9 wherein the capacity utilization apparatus further includes a start flag detector for detecting the beginning of a received packet and in response thereto for generating a reset signal for the counter and the second counter.

12. The optical router of claim 9 wherein the second interval is much greater than the first interval.

13. The optical router of claim 1 wherein the packet combiner apparatus operates under control of an algorithm for (1) ordering a set of packet utilization levels for each of said plurality of wavelengths and for (2) combining packets from two or more of the plurality of wavelengths for transmission over one wavelength, when the sum of the packet utilization levels is less than a predetermined packet utilization level.

14. The optical router of claim 13 wherein the algorithm includes the step of further combining packets from another wavelength to the combined packets when the packet utilization level for said another wavelength when added to said sum is less than the predetermined channel utilization level.

15. The optical router of claim 14 wherein the first and second predetermined capacity utilization level are about the same.

16. The optical router of claim 15 wherein the first and second predetermined capacity utilization level are about 0.7.

17. The optical router of claim 13 wherein the predetermined capacity utilization level is about 0.7.

18. The optical router of claim 13 wherein following step (1) the algorithm includes the additional step of checking the utilization level of the plurality of wavelengths and wherein the combining step (2) only combines packets from two or more of the plurality of wavelengths which have a utilization level which is below a second predetermined utilization level.

19. The optical router of claim 1 wherein the capacity utilization apparatus includes
 a separate optical tap for obtaining a wavelength signal from each of the plurality of wavelengths and a common capacity utilization circuit for receiving the wavelength signals from the optical taps and for determining a capacity utilization level of each of the received wavelengths.

20. The optical router of claim 1 wherein the capacity utilization apparatus includes
 a separate optical tap for obtaining an optical signal from each of the plurality of wavelengths,
 a separate optical detector for converting each wavelength signal to an electrical signal,
 a separate buffer for storing electrical signals associated with each wavelength signal, and
 a common capacity utilization circuit for receiving signals from each buffer and for determining a capacity utilization level of each wavelength signal.

21. The optical router of claim 20 further comprising the step of
 detecting the destination of packets on each of said two or more wavelengths and wherein
 the combining step combines only packets from said two or more wavelengths onto one wavelength having the same destination.

22. A method of operating an optical router comprising the steps of:
 determining a capacity utilization level of each of a plurality of wavelengths being received at the optical router and
 combining packets from said two or more wavelengths onto one of said two or more wavelengths for transmission from the optical router when the combined determined capacity utilization level on said two or more wavelengths is less than a predetermined capacity utilization level.

* * * * *